United States Patent
Kim et al.

(10) Patent No.: US 11,209,011 B2
(45) Date of Patent: Dec. 28, 2021

(54) AIR CONDITIONER

(71) Applicants: LG ELECTRONICS INC., Seoul (KR); SEOUL NATIONAL UNIVERSITY R&DB FOUNDATION, Seoul (KR)

(72) Inventors: Taejun Kim, Seoul (KR); Seokho Choi, Seoul (KR); Siyoung Oh, Seoul (KR); Yongcheol Sa, Seoul (KR); Haecheon Choi, Seoul (KR); Keuntae Park, Seoul (KR)

(73) Assignees: LG ELECTRONICS INC., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 421 days.

(21) Appl. No.: 16/346,390

(22) PCT Filed: Nov. 1, 2017

(86) PCT No.: PCT/KR2017/012240
§ 371 (c)(1),
(2) Date: Apr. 30, 2019

(87) PCT Pub. No.: WO2018/084560
PCT Pub. Date: May 11, 2018

(65) Prior Publication Data
US 2020/0063752 A1 Feb. 27, 2020

(30) Foreign Application Priority Data
Nov. 1, 2016 (KR) .................. 10-2016-0144189

(51) Int. Cl.
*F04D 29/32* (2006.01)
*F24F 1/38* (2011.01)
(Continued)

(52) U.S. Cl.
CPC .............. *F04D 29/325* (2013.01); *F24F 1/38* (2013.01); *B60H 2001/006* (2013.01);
(Continued)

(58) Field of Classification Search
CPC .... F04D 29/325; F04D 29/667; F04D 29/526; F04D 29/164; F04D 19/002; F24F 1/38;
(Continued)

(56) References Cited

U.S. PATENT DOCUMENTS

2014/0105746 A1* 4/2014 Findeisen ............. F04D 29/325
  416/182
2016/0281739 A1 9/2016 Nakagawa et al.
(Continued)

FOREIGN PATENT DOCUMENTS

CN 1707175 12/2005
CN 2893513 4/2007
(Continued)

OTHER PUBLICATIONS

Chinese Office Action dated Oct. 9, 2020 issued in Application No. 201780081762.0 (English translation attached).
(Continued)

*Primary Examiner* — Emmanuel E Duke
(74) *Attorney, Agent, or Firm* — Ked & Associates, LLP

(57) ABSTRACT

Disclosed is an air conditioner that suppresses generation of leakage vortices between a fan and a shroud. An air conditioner according to an embodiment of the present invention includes: an axial fan for blowing air; a shroud partially surrounding a circumference of the axial fan to guide air blown by the axial fan; and a fence ring provided in an inner surface of the shroud and protruding in a radial direction from the inner surface of the shroud. In addition, the fence ring is disposed between a downstream end of the axial fan and a downstream end of the shroud.

10 Claims, 7 Drawing Sheets

(51) Int. Cl.
  *B60H 1/00* (2006.01)
  *F04D 29/66* (2006.01)
  *F24F 13/20* (2006.01)

(52) U.S. Cl.
  CPC ............ *F04D 29/667* (2013.01); *F24F 13/20* (2013.01); *F24F 2013/205* (2013.01)

(58) Field of Classification Search
  CPC ........ F24F 13/20; F24F 2013/205; F24F 1/40; B60H 2001/006
  See application file for complete search history.

(56) References Cited

U.S. PATENT DOCUMENTS

2016/0341220 A1* 11/2016 Kondou ................ F04D 29/526
2017/0350412 A1* 12/2017 Hioki ................... F04D 29/164

FOREIGN PATENT DOCUMENTS

| CN | 201259294 | 6/2009 |
| CN | 101498501 | 8/2009 |
| CN | 201311005 | 9/2009 |
| CN | 102203430 | 9/2011 |
| CN | 103899576 | 7/2014 |
| CN | 104661915 | 5/2015 |
| JP | 2013-221439 | 10/2013 |
| KR | 10-2001-0029365 | 4/2001 |
| KR | 10-2001-0059280 | 7/2001 |
| KR | 10-0582933 | 5/2006 |
| KR | 10-2015-0063944 | 6/2015 |
| KR | 10-2016-0089475 | 7/2016 |

OTHER PUBLICATIONS

International Search Report (with English Translation) and Written Opinion dated Mar. 7, 2018 issued in Application No. PCT/KR2017/012240.

* cited by examiner (a)

(b)

(c)

(a)

(b)

AIR CONDITIONER

CROSS-REFERENCE TO RELATED PATENT APPLICATIONS

This application is a U.S. National Stage Application under 35 U.S.C. § 371 of PCT Application No. PCT/KR2017/012240, filed Nov. 1, 2017, which claims priority to Korean Patent Application No. 10-2016-0144189, filed Nov. 1, 2016, whose entire disclosures are hereby incorporated by reference.

TECHNICAL FIELD

The present invention relates to an air conditioner, and more particularly to an air conditioner having an axial fan and a shroud for guiding air blown by the axial fan.

BACKGROUND ART

An air conditioner is an apparatus for controlling indoor temperature by exchanging heat with a refrigerant and ambient air. The air conditioner may include an indoor unit installed indoor to discharge cool air/hot air, and an outdoor unit installed outside to exchange heat with the refrigerant with outdoor air.

Each of the indoor unit and the outdoor unit includes a heat exchanger for exchanging heat between ambient air and a refrigerant, and heat exchangers are connected to each other via a refrigerant tube. In order to allow the refrigerant to transfer along the refrigerant tube, a compressor is provided and generally provided in the outdoor unit.

The outdoor unit of the air conditioner is provided with a fan for blowing outdoor air and a shroud partially surrounding the fan to guide air blown by the fan. Leakage vortex is generated between the fan and the shroud, thereby reducing efficiency and causing noise.

DISCLOSURE

Technical Problem

An object of the present invention is to provide an air conditioner that suppresses generation of leakage vortex between a fan and a shroud.

Objects of the present invention should not be limited to the aforementioned objects and other unmentioned objects will be clearly understood by those skilled in the art from the following description.

Technical Solution

In order to achieve the aforementioned object, an air conditioner according to an embodiment of the present invention includes: an axial fan for blowing air; a shroud partially surrounding a circumference of the axial fan to guide air blown by the axial fan; and a fence ring provided in an inner surface of the shroud and protruding in a radial direction from the inner surface of the shroud, wherein the fence ring is disposed between a downstream end of the axial fan and a downstream end of the shroud.

The shroud may be comprised of an inlet portion having an inner diameter decreasing from an upstream side toward a downstream side in a flow direction of air passing through the shroud, and an outlet portion positioned at a downstream side of the inlet portion and having a constant inner diameter, and the fence ring may be disposed in the outlet portion.

A portion in a vertical cross section of the fence ring may be formed vertical to an inner surface of a vertical cross section of the outlet portion.

The fence ring may protrude continuously from the shroud.

An edge of a vertical cross section of the fence ring may be rounded.

The shroud may have a reinforcement ring formed on an outer surface of the shroud and protruding in a radial direction, and the fence ring may be disposed between the reinforcement ring and a downstream end of the shroud.

A protruding height of the fence ring may be smaller than a tip clearance that is a minimum distance between a tip of the axial fan and the inner surface of the shroud.

The protruding height of the fence may have a value that is 50% to 80% of the tip clearance.

A protruding height of the fence ring may have a value that corresponds to 1% to 3% of a diameter length of the axial fan.

The protruding height of the fence ring may have a value that corresponds to 1.2% to 2% of the diameter length of the axial fan.

The details of other embodiments are included in the following description and the accompanying drawings.

Advantageous Effects

According to embodiments of the present invention, there are advantageous effects as follows.

First, generation of leakage vortex between a fan and a shroud may be suppressed as a fence ring protruding from an inner surface of the shroud is provided.

Second, air flow efficiency per power consumption may increase as the generation of leakage vortex between the fan and the shroud is suppressed.

Third, noise may be reduced as the generation of leakage vortex between the fan and the shroud is suppressed.

Fourth, increase in power consumption may be minimized or power consumption may be reduced, thanks to the fence ring protruding from the inner surface of the shroud.

Fifth, rigidity of the shroud may be enhanced, thanks to the fence ring protruding from the inner surface of the shroud.

Effects of the present invention are not limited to those described above and other effects of the present invention will be apparent to those skilled in the art from the following descriptions. The scope of the claims is not limited to the aforementioned effects.

BEST MODE

Figure 1:
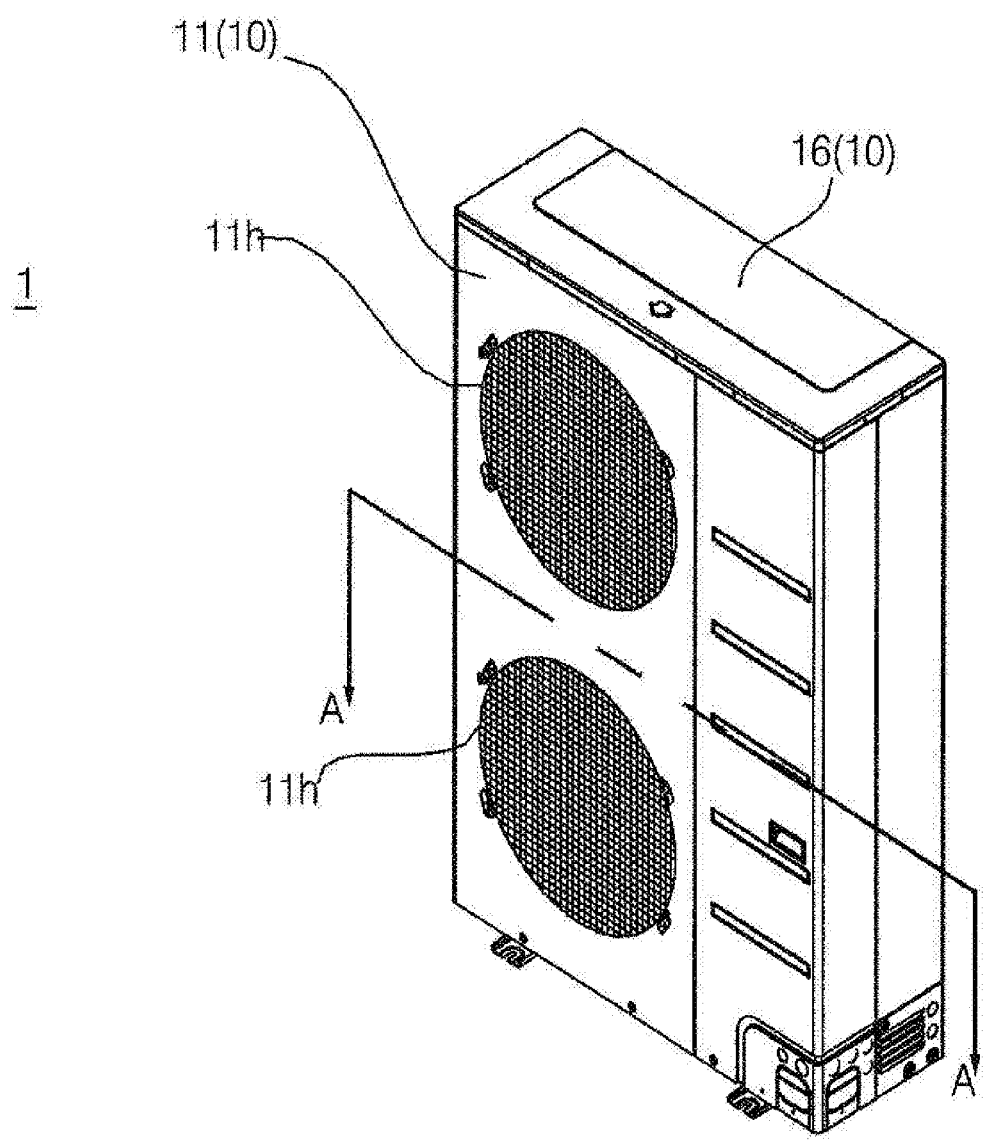
FIG. 1 is a perspective view of an outdoor unit of an air conditioner according to an embodiment of the present invention.

Advantages and features of the present invention, and methods for achieving the same will be clearly understood from embodiments described below in detail with reference to the accompanying drawings. The embodiments may, however, the present invention is not limited to exemplary embodiments disclosed herein but may be implemented in various different ways, and these embodiments are provided so that disclosure of the present invention will be thorough and complete and will fully convey the scope of the inventive concept to those skilled in the art, and the scope of the inventive concept should be defined by the following claims. Throughout the present specification, like reference numerals denote like elements.

Hereinafter, an air conditioner according to embodiments of the present invention will be described with reference to the drawings.

Figure 2:
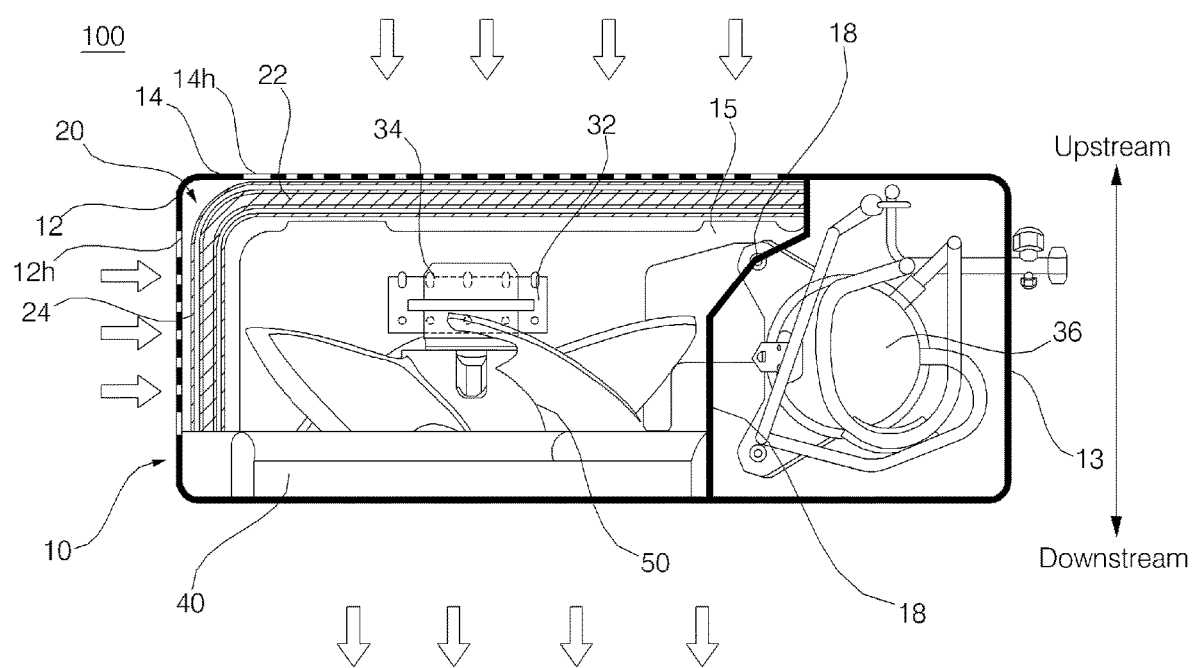
FIG. 2 is a cross-sectional view of the outdoor unit in FIG. 1, taken along line A-A.

FIG. 1 is a perspective view of an outdoor unit of an air conditioner according to an embodiment of the present invention, and FIG. 2 is a cross-sectional view of the outdoor unit in FIG. 1, taken along line A-A.

An outdoor unit 1 of an air conditioner according to an embodiment of the present invention includes: a cabinet 10 forming an external appearance, a compressor 36 provided inside the cabinet 10 and compressing a refrigerant, a motor 34 generating a rotational force, an axial fan 50 rotating by the motor 34 to blow air, and a shroud 40 partially surrounding a circumference of the axial fan 50.

The cabinet 10 has a predetermined space formed therein, a discharge hole 11h formed on a front surface, and a side-surface suction hole 12h and a rear-surface suction hole 14h respectively formed on a left side surface and a rear surface. When the axial fan 50 rotates, air is suctioned through the side-surface suction hole 12h and the rear-surface suction hole 14h, passes through a heat exchanger 20, and is then discharged forward through the discharge hole 11h.

The cabinet 10 is formed in an approximate cuboid shape, and comprised of a front part 11 defining a front surface of the cabinet, a left-side part 12 defining a left side surface of the cabinet, a right side part 13 defining a right side surface of the cabinet, a rear part 14 defining a rear surface of the cabinet, a top part 16 defining a top surface of the cabinet, and a bottom part 15 defining a bottom on which various devices such as a compressor 36 and the like are installed.

The side-surface suction hole 12h may be formed in plural on the left side part 12. The rear-surface suction hole 14h may be formed in plural on the rear part 14.

The discharge hole 11h may be formed in at least one on the front part 11. In the present embodiment, a pair of discharge holes 11h are disposed vertically. In the case where a pair of discharge holes 11h is disposed, a pair of motors 24, a pair of axial fans 50, and a pair of shrouds 40 may be respectively provided, and a pair of the heat exchangers 20 may be also provided vertically.

The inside of the cabinet 10 is divided into a machine chamber and a heat exchange chamber by a partition 18, and the compressor 36 and the like are disposed in the machine chamber while the heat exchanger 20, the motor 34, the axial fan 50, and the shroud 40, and the like are disposed in the heat exchange chamber.

The compressor 36 is connected to the heat exchanger 20 via a refrigerant tube such that a refrigerant compressed by the compressor 36 in a cooling operation is condensed in the heat exchanger 20 and a refrigerant evaporated in the heat exchanger 20 in a heating operation is compressed by the compressor 36.

The motor 34 provides a rotational force to the axial fan 50. The axial fan 50 is coupled to a rotation shaft of the motor 24. The axial fan 50 blows air when rotating by the motor 24. The axial fan 50 blows air in a direction toward the rotational shaft.

The shroud 40 is formed in an annual shape and guides air blown by the axial fan 50 toward the discharge hole 11h formed in the front part 11. The shroud 40 is disposed partially surrounding a downstream circumference of the axial fan 50.

An inlet through which air blown by the axial fan 50 is suctioned, and an outlet through which the air suctioned through the inlet is discharged are formed in the shroud 40, and the outlet is smaller in size than the inlet. Air suctioned through the inlet of the shroud 40 is discharged through the outlet, and the air increases in speed while being discharged through the outlet. The shroud 40 gathers air blown by the axial fan 50, thereby increasing air flow efficiency.

Figure 3:
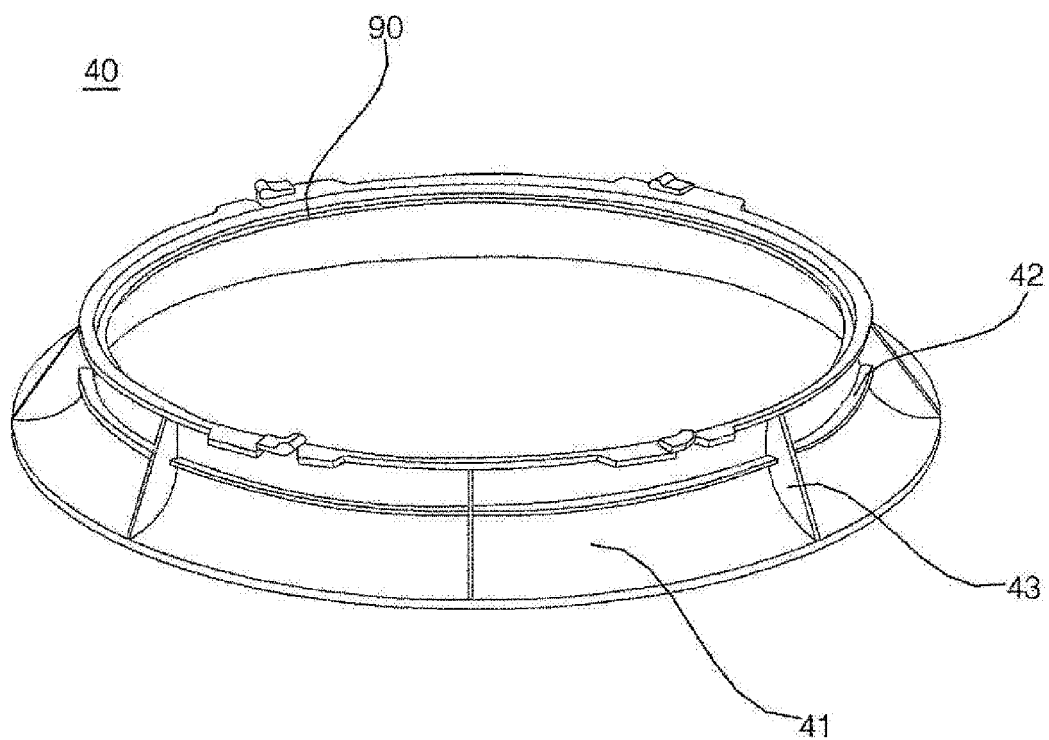
FIG. 3 is a perspective view of a shroud shown in FIG. 2.
Figure 4:
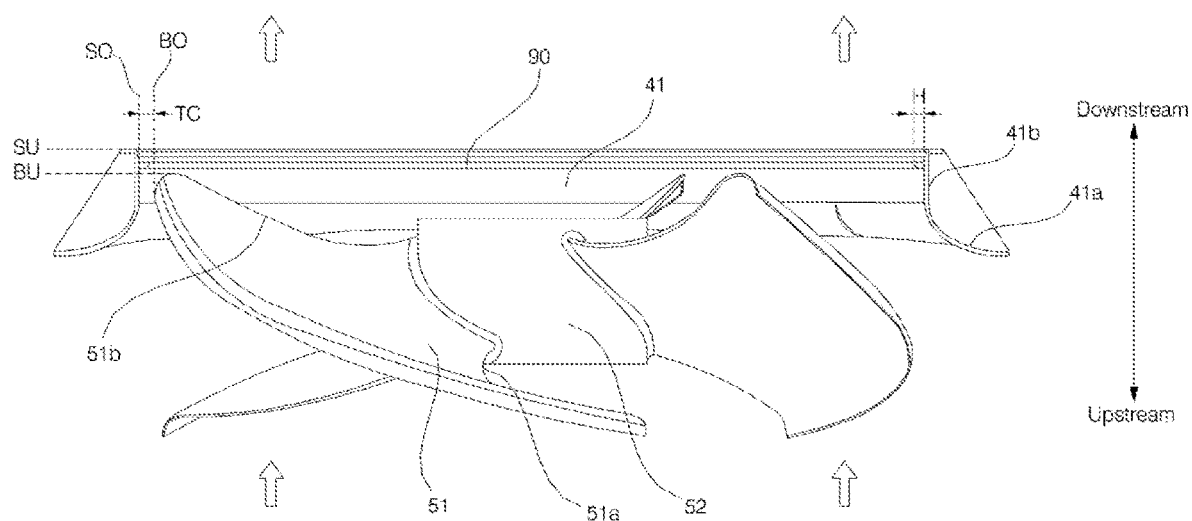
FIG. 4 is a cross-sectional view of the shroud and the fan shown in FIG. 2.

FIG. 3 is a perspective view of the shroud shown in FIG. 2, and FIG. 4 is a cross-sectional view of the shroud and the fan shown in FIG. 2.

The shroud 40 is comprised of an annual body 41, an annual reinforcement ring 42 protruding in a radial direction from an outer surface of the body 41 and, and a reinforcement rib 43 formed on the outer surface of the body 41 in an air flow direction. The reinforcement ring 42 and the reinforcement rib 43 reinforce rigidity of the body 41. The body 41 of the shroud 40 is comprised of an inlet portion 41a having an inner diameter reduced from an upstream side to a downstream side of the air flow direction, and an outlet portion 41b disposed at the downstream side of an air flow direction in the inlet portion 41a and having a constant inner diameter. A cross section of an inner surface of the outlet portion 41b (a cross section in an upstream-downstream direction) is a straight line in a vertical direction (the upstream-downstream direction).

The inlet portion 41a and the outlet portion 41b are disposed at positions overlapping at least a portion of a blade 51.

The axial fan 50 is comprised of a hub 52 coupled to the rotational shaft of the motor 34, and a plurality of blades 51 connected to each other and spaced apart from each other in a circumferential direction on a circumference of the hub 52. An edge of a blade 51 is composed of a leading edge 51a over which air is introduced, and a trailing edge 51b over which air is discharged. In addition, an outermost point in an edge of a blade 51 in a circumferential direction (a direction vertical to direction of a rotating shaft of the axial fan 50) is referred to as a tip. The direction of the rotating shaft of the axial fan 50 is a direction identical to the air flow direction (the upstream-downstream direction).

The air conditioner according to an embodiment of the present invention includes a fence ring 90 provided on an inner surface of the body 41 of the shroud 40 and protruding from the inner surface of the body 41 of the shroud 40 in a radial direction (a direction facing the center of rotation of the axial fan 50). The fence ring 90 is disposed on the inner surface of the outlet portion 41b of the body 41 of the shroud 40.

At least a portion of a vertical cross section (a cross section in the upstream-downstream direction) of the fence ring 90 may be formed as a straight line in a horizontal direction (a direction vertical to the upstream-downstream direction). It is preferable that a portion in a top surface of the vertical cross section of the fence ring 90 and a portion in a bottom surface of the vertical cross section of the fence ring 90 are vertical to an inner surface of a vertical cross section of the outlet portion 41b. As a portion of the vertical cross section of the fence ring 90 is vertical to the inner surface of the vertical cross section of the outlet portion 41b, rigidity of the exit power 41b may be reinforced.

The fence ring 90 is disposed between a downstream end BU of the axial fan 50 and a downstream end SU of the body 41 of the shroud 40. The downstream end BU of the axial fan 50 may refer to an outermost point BO of the trailing edge 51b. The fence ring 90 is disposed between the reinforcement ring 42 and the downstream end BU of the shroud 40.

The fence ring 90 may be formed in a shape of a ring continued from the inner surface of the outlet portion 41b of the body 41 or in a shape of a plurality of arcs discontinued at some portions. The fence ring 90 may be formed in a ring shape continued at the same position between the downstream end BU of the axial fan 50 and the downstream end SU of the body 41 of the shroud 40, or may be disposed in a shape in which a plurality of arcs is discontinued at some portions.

If the fence ring 90 is positioned closer to the downstream end BU of the axial fan 50, generation of leakage vortex is suppressed more but air discharging by the axial fan 50 is carried out less smoothly, and, if the fence ring 90 is positioned closer to the downstream end SU of the body 41 of the shroud 40, air discharging by the axial fan 50 is carried out more smoothly but more leakage vortex is generated. Thus, considering the above, it is preferable that the fence ring 90 is disposed at an appropriate position.

A protruding height H of the fence ring 90 is smaller than a tip clearance TC indicating a minimum distance between a tip of the axial fan 50 and the inner surface of the shroud. The protruding height H of the fence ring 90 is smaller than a maximum distance TC between the outermost point BO of the trailing edge 51b of the axial fan 50 and an inner surface end of the body 41 of the shroud 40 (a point having the minimum diameter in the inner surface of the body 41 of the shroud 40).

It is preferable that the protruding height H of the fence ring 90 has a value that corresponds to 50-80% of the tip clearance TC.

The protruding height H of the fence ring 90 may be formed in various forms. The protruding height H of the fence ring 90 may be formed with a length that corresponds to 1% to 3% of a diameter length of the axial fan 50. Preferably, the protruding height H of the fence ring 90 has a value between 1.2% and 2% of the diameter length of the axial fan 50. If the protruding height H of the fence ring 90 calculated through comparison with the diameter length of the axial fan 50 exceeds the tip clearance TC, it is preferable that the protruding height H has a value that corresponds to 50-80% of the tip clearance TC.

If a protruding end (an inner end) of the fence ring 90 is positioned closer to the outermost point BO of the trailing edge 51b of the axial fan 50, generation of leakage vortex is suppressed more but air discharging by the axial fam 50 is carried out less smoothly, and if the protruding end of the fence ring 90 is positioned closer to the inner end of the body 41 of the shroud 40, air discharging by the axial fan 50 is carried out more smoothly but more leakage vortex is generated. Thus, considering the above, it is preferable that the protruding height H of the fence ring 90 is determined appropriately.

Figure 5:
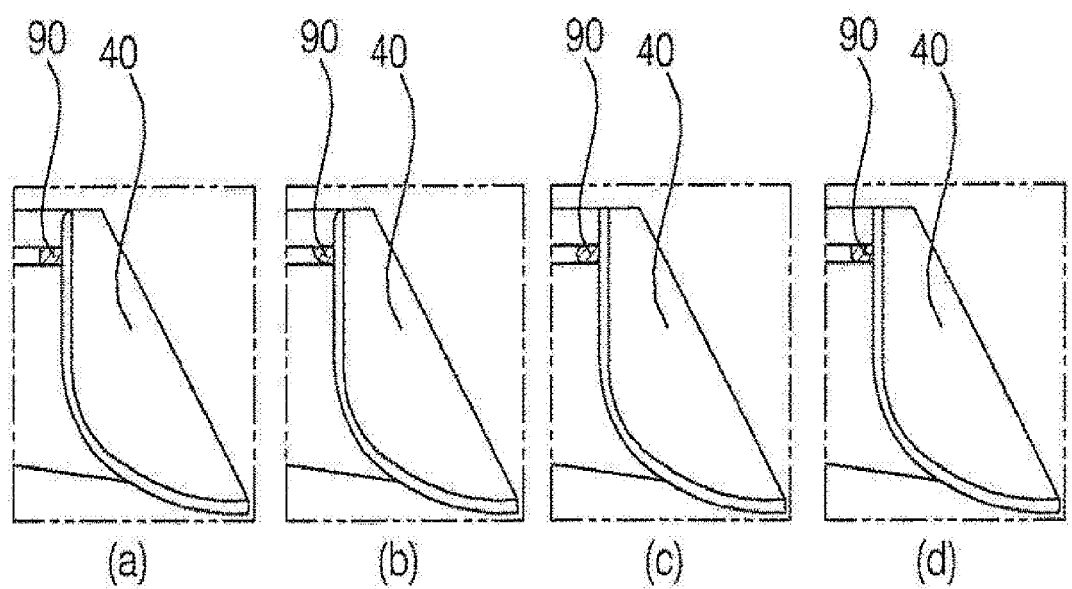
FIG. 5 is a diagram illustrating various embodiments of a cross section of the fence ring shown in FIG. 3.

FIG. 5 is a diagram illustrating various embodiments of a cross section of the fence ring shown in FIG. 3.

Referring to FIG. 5(a), an edge of a protruding end of the fence ring 90 may be angled. Referring to FIG. 5(b) to FIG. 5(d), part of an edge of a vertical cross section of the fence ring 90 may be rounded.

As described above, part of the vertical cross section of the fence ring 90 may be formed as a straight line in a horizontal direction, and other part of the vertical cross section may be rounded.

FIG. 5(b) shows an example in which an upstream edge in a cross section of the protruding end of the fence ring 90 is formed in a rounded shape, FIG. 5(c) shows an example in which both an upstream edge and a downstream edge of a cross section of the protruding end of the fence ring 90 are formed in a rounded shape, and FIG. 5(d) shows an example in which a cross section of the protruding end of the fence ring 90 is formed in a "L" shape while an upstream edge of the cross section is formed in a rounded shape.

In order to make air to be discharged by the axial fan 50 smoothly, it is preferable that an upstream edge in a cross section of the protruding end of the fence ring 90 is formed in a round shape.

Figure 6:
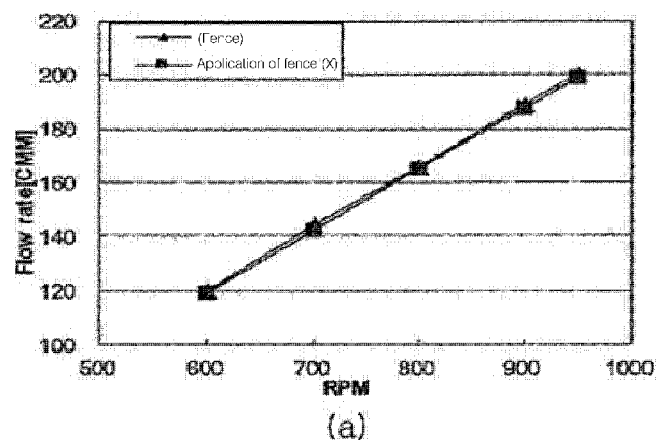
FIG. 6 is a diagram showing performance of an air conditioner when a fence ring of an air conditioner according to an embodiment of the present invention is applied.
Figure 6:
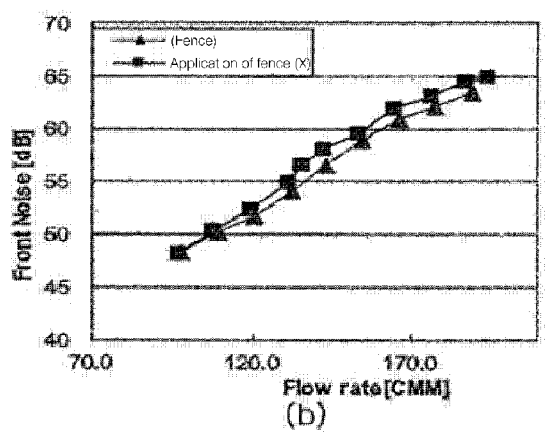
Figure 6:
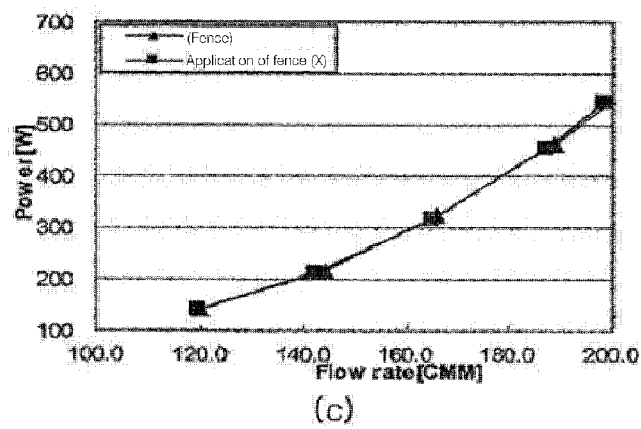

FIG. 6 is a diagram showing performance of an air conditioner when a fence ring of an air conditioner according to an embodiment of the present invention is applied.

Referring to FIG. 6(a), when the fence ring 90 is applied, a flow rate is increased by about 1 CMM on average at a rotation speed RPM of the axial fan 50. Referring to FIG. 6(b), when the fence ring 90 is applied, noise is reduced by about 1.5 dB on average at the same flow rate CMM. Referring to FIG. 6(c), when the fence ring 90 is applied, power consumption is reduced by about 2.5 W on average at the same flow rate CMM.

Figure 7:
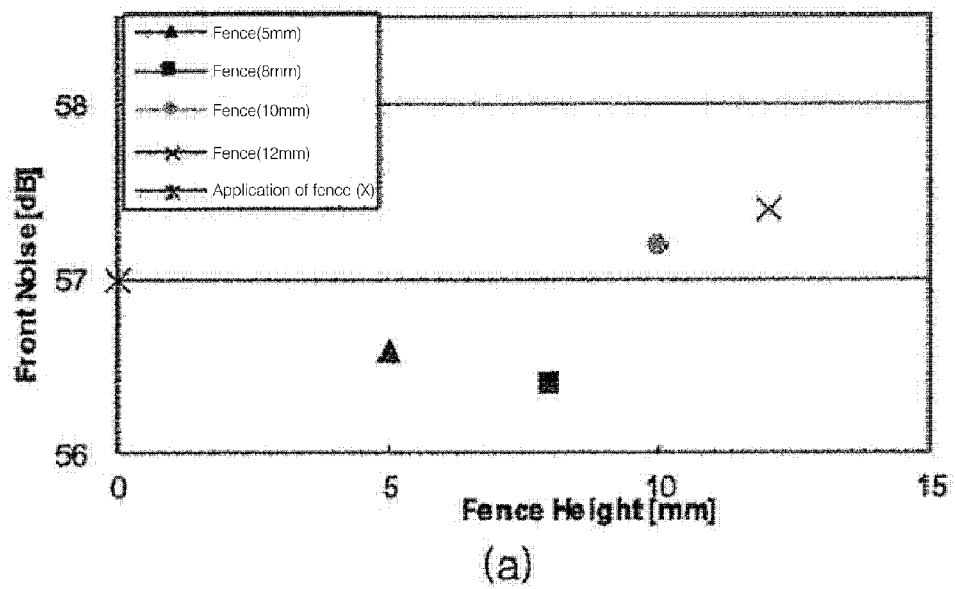
FIG. 7 is a diagram showing a relationship between a height of a fence ring of an air conditioner according to an embodiment of the present invention and performance of the air conditioner.
Figure 7:
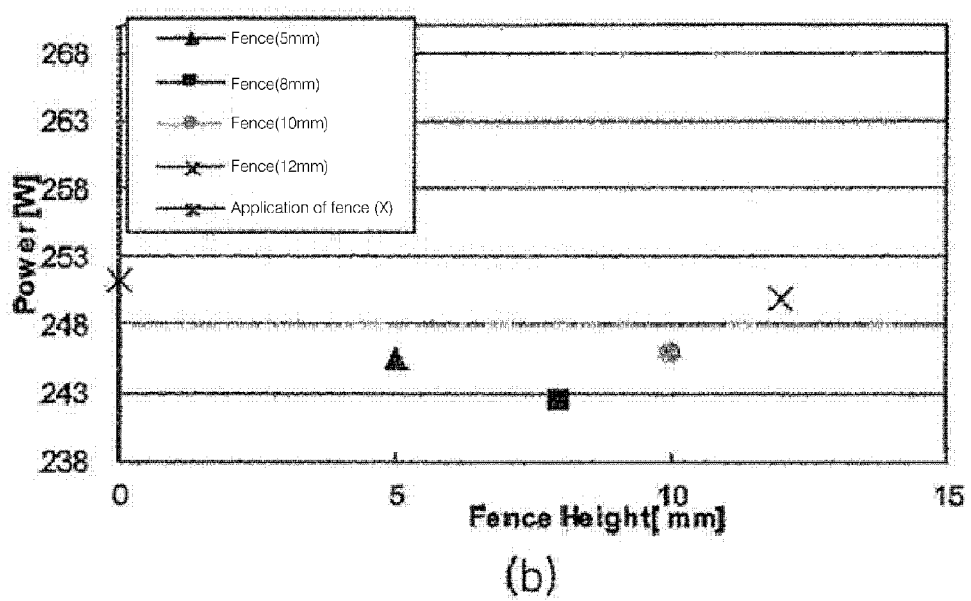

FIG. 7 is a diagram showing a relationship between a height of a fence ring of an air conditioner according to an embodiment of the present invention and performance of the air conditioner.

According to a result of an experiment in a condition where a diameter length of an axial fan 50 is 400 mm and a flow rate is 150 CMM, noise is at 56.6 dB and power consumption is at 245.6 W when the protruding height H of a fence ring 90 is 5 mm (1.25% of a diameter length of the axial fan), and noise is at 54.4 dB and power consumption is at 242.4 W when the protruding height of the fence ring 90 is 8 mm H (2% of the diameter length of the axial fan). However, noise is at 57.2 dB and power consumption is at 246 W when the protruding height H of the fence ring 90 is 10 mm (2.5% of the diameter length of the axial fan), and noise is at 57.4 dB and power consumption is at 250 W when the protruding height H of the fence ring 90 is 12 mm (3% of the diameter length of the axial fan). In particular, in the case where the fence ring 90 is not applied, noise in 57 dB and power consumption in 251.4 W are found, and therefore, it is preferable that the protruding height H of the fence ring 90 has a value that corresponds to 1.2% to 2% of the diameter length of the axial fan 50.

Although the exemplary embodiments have been illustrated and described, embodiments are not limited to the above-described particular embodiments, various modifications are possible by those skilled in the art without departing from the scope and spirit as disclosed in the accompanying claims and these modifications should not be understood separately from the scope and spirit.

INDUSTRIAL APPLICABILITY

The present invention is applicable in a blow device having an axial fan and a shroud provided in the surroundings of the axial fan.

The invention claimed is:

1. An air conditioner, comprising:
   an axial fan for blowing air;
   a shroud partially surrounding a circumference of the axial fan to guide air blown by the axial fan; and
   a fence ring provided in an inner surface of the shroud and protruding in a radial direction from the inner surface of the shroud,
   wherein the fence ring is disposed between a downstream end of the axial fan and a downstream end of the shroud.

2. The air conditioner of claim 1,
   wherein the shroud is comprised of an inlet portion having an inner diameter decreasing from an upstream side toward a downstream side in a flow direction of air passing through the shroud, and an outlet portion positioned at a downstream side of the inlet portion and having a constant inner diameter, and
   wherein the fence ring is disposed in the outlet portion.

3. The air conditioner of claim 2, wherein a portion in a vertical cross section of the fence ring is formed vertical to an inner surface of a vertical cross section of the outlet portion.

4. The air conditioner of claim 1, wherein the fence ring protrudes continuously from the shroud.

5. The air conditioner of claim 1, wherein an edge of a vertical cross section of the fence ring is rounded.

6. The air conditioner of claim 1,
   wherein the shroud has a reinforcement ring formed on an outer surface of the shroud and protruding in a radial direction, and
   wherein the fence ring is disposed between the reinforcement ring and a downstream end of the shroud.

7. The air conditioner of claim 1, wherein a protruding height of the fence ring is smaller than a tip clearance that is a minimum distance between a tip of the axial fan and the inner surface of the shroud.

8. The air conditioner of claim 7, wherein the protruding height of the fence has a value that is 50% to 80% of the tip clearance.

9. The air conditioner of claim 1, wherein a protruding height of the fence ring has a value that corresponds to 1% to 3% of a diameter length of the axial fan.

10. The air conditioner of claim 9, wherein the protruding height of the fence ring has a value that corresponds to 1.2% to 2% of the diameter length of the axial fan.

* * * * *